No. 693,830. Patented Feb. 25, 1902.
J. BURKE.
PIPE COUPLING.
(Application filed Apr. 27, 1900.)
(No Model.)
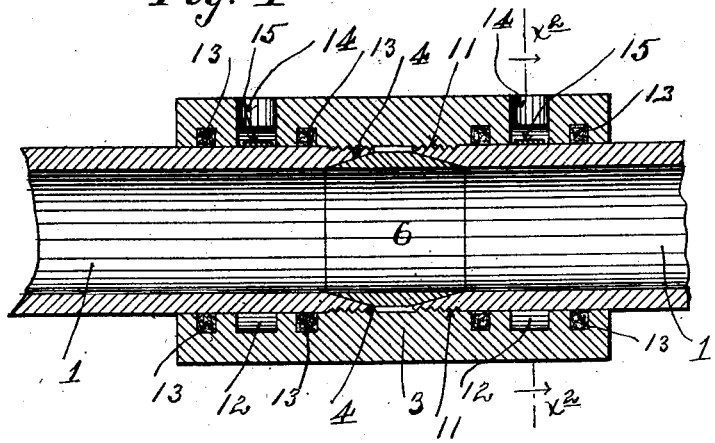
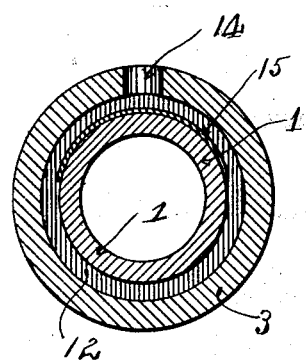
Witnesses
Robert Otto
Harry Kilgore
Inventor:
James Burke.
By his Attorneys.
Williamson & Merchant

UNITED STATES PATENT OFFICE.

JAMES BURKE, OF MINNEAPOLIS, MINNESOTA.

PIPE-COUPLING.

SPECIFICATION forming part of Letters Patent No. 693,830, dated February 25, 1902.

Application filed April 27, 1900. Serial No. 14,565. (No model.)

*To all whom it may concern:*

Be it known that I, JAMES BURKE, a citizen of the United States, residing at Minneapolis, in the county of Hennepin and State of Minnesota, have invented certain new and useful Improvements in Pipe-Couplings; and I do hereby declare the following to be a full, clear, and exact description of the invention, such as will enable others skilled in the art to which it appertains to make and use the same.

My present invention has for its object to provide an improved pipe-coupling, and is especially directed to the improvement of that class of pipe-couplings which are employed to connect hard or soft metal pipes either to each other or to a hard-metal pipe member.

To the above ends the invention consists of the novel devices and combinations of devices hereinafter described, and defined in the claim.

The invention is illustrated in the accompanying drawings, wherein like characters indicate like parts in both views.

Figure 1 is a view in longitudinal section showing a pair of pipes connected by one of my improved couplings, and Fig. 2 is a transverse section on the line $x^2$ $x^2$ of Fig. 1.

The numeral 1 indicates a pair of tubular sections, which may be assumed to be lead pipes. The ends of these pipes 1 are tapered or in the form of annular wedges, which may be beveled internally. These beveled wedge-shaped ends of the pipes are adapted to telescope within a hard-metal socket 3, which socket is formed or provided with flaring annular seats 4, that receive and closely fit the beveled annular ends of the pipes 1. These beveled annular seats 4 are formed between the bore or inner surface of the socket member 3 and a loose externally-beveled bushing or thimble 8, which is preferably of hard metal.

The socket member 3 is provided on opposite sides of the bushing or thimble 6 with annular internal solder-containing cavities 12, on each side of each of which are embedded annular packings 13 of any suitable material, which is preferably slightly compressible or expansible, so that they will tightly engage the outer surfaces of pipes 1 and serve as dams to prevent the running of solder. Solder may be placed in the cavities 12 either before or after the coupling is applied to the pipes. In the former case the solder would necessarily be melted by the external application of heat after the parts are telescoped, while in the latter case the molten solder could be run into the said cavities 12 through perforations 14, provided in the bushing for that purpose. To prevent the molten solder from acting with too great intensity on the lead pipes as it falls onto the same through the perforations 14, segmental stripes 15 of brass or other metal of high fusibility may be applied, as shown in Figs. 1 and 2.

What I claim, and desire to secure by Letters Patent of the United States, is as follows:

The combination with a lead or soft metal pipe, of a socket telescoping with the end of said pipe and provided with an annular channel exposed to the surface of said pipe, solder in said annular channel and annular packings within said socket, on opposite sides of said solder-containing channel, which packings are adapted to closely fit and telescope over the end of said pipe and to serve as dams to prevent the solder from running into the interior of said pipe and out of the end of the coupling, substantially as described.

In testimony whereof I affix my signature in presence of two witnesses.

JAMES BURKE.

Witnesses:
  MABEL M. McGRORY,
  F. D. MERCHANT.